United States Patent
Matsuo et al.

(10) Patent No.: US 9,200,140 B2
(45) Date of Patent: Dec. 1, 2015

(54) BINDER COMPOSITION FOR MOLD FORMATION

(71) Applicant: KAO CORPORATION, Tokyo (JP)

(72) Inventors: Toshiki Matsuo, Toyohashi (JP); Takashi Joke, Toyohashi (JP); Masayuki Kato, Toyohashi (JP)

(73) Assignee: KAO CORPORATION, Toyko (JP)

( * ) Notice: Subject to any disclaimer, the term of this patent is extended or adjusted under 35 U.S.C. 154(b) by 0 days.

(21) Appl. No.: 14/355,156

(22) PCT Filed: Oct. 30, 2012

(86) PCT No.: PCT/JP2012/006964
§ 371 (c)(1),
(2) Date: Apr. 29, 2014

(87) PCT Pub. No.: WO2013/065291
PCT Pub. Date: May 10, 2013

(65) Prior Publication Data
US 2014/0336331 A1    Nov. 13, 2014

(30) Foreign Application Priority Data
Oct. 31, 2011 (JP) ................................. 2011-238967
Dec. 28, 2011 (JP) ................................. 2011-289651

(51) Int. Cl.
*C08K 5/07* (2006.01)
*B22C 1/22* (2006.01)
*C08K 5/1535* (2006.01)
*C08K 3/00* (2006.01)
*C08K 5/13* (2006.01)

(52) U.S. Cl.
CPC ............. *C08K 5/1535* (2013.01); *B22C 1/2253* (2013.01); *C08K 3/00* (2013.01); *C08K 5/07* (2013.01); *C08K 5/13* (2013.01)

(58) Field of Classification Search
CPC .......... C08L 61/24; C08K 5/07; B22C 1/2253
See application file for complete search history.

(56) References Cited

U.S. PATENT DOCUMENTS 4,439,568 A * 3/1984 Bogner ........................ 524/111
2008/0207796 A1   8/2008 Clingerman et al.

FOREIGN PATENT DOCUMENTS

| CN | 101463238 A | 6/2009 |
|----|-------------|--------|
| JP | 49-99696 A | 9/1974 |
| JP | 2011-45904 A | 3/2011 |
| JP | 2011-62729 A | 3/2011 |

* cited by examiner

*Primary Examiner* — Vickey Nerangis
(74) *Attorney, Agent, or Firm* — Birch, Stewart, Kolasch & Birch, LLP

(57) ABSTRACT

Disclosed is a binder composition for mold formation including: one or more 5-position substituted furfural compounds selected from the group consisting of 5-hydroxymethylfurfural and 5-acetoxymethylfurfural; and a furfurylated urea resin. The content of the 5-position substituted furfural compound(s) in the binder composition for mold formation is preferably from 1 to 30% by weight, and the content of the furfurylated urea resin is preferably from 1 to 20% by weight.

22 Claims, No Drawings

BINDER COMPOSITION FOR MOLD FORMATION

TECHNICAL FIELD

The present invention relates to a binder composition for mold formation comprising one or more 5-position substituted furfural compounds selected from the group consisting of 5-hydroxymethylfurfural and 5-acetoxymethylfurfural, and a furfurylated urea resin; and a composition for a mold using the same.

BACKGROUND ART

Acid-hardening self-hardening molds are each produced by adding, to refractory particles such as silica sand, a binder for mold formation containing an acid-hardening resin, and a hardening agent including phosphoric acid, an organic sulfonic acid, sulfuric acid or some other acid, mixing and kneading these components, filling the resultant kneaded sand into an original pattern such as a wooden pattern, and then hardening the acid-hardening resin. As the acid-hardening resin, a furan resin, a phenolic resin or the like is used. As the furan resin, the following is used: furfuryl alcohol, furfuryl alcohol/urea-formaldehyde resin, furfuryl alcohol/formaldehyde resin, furfuryl alcohol/phenol/formaldehyde resin, some other known modified furan resins or the like.

An important requirement for producing a mold is the mold-producing performance. In order to raise, in a self-hardening mold, the production performance of the mold, it is necessary to shorten a period required from a time when kneaded sand is filled into an original pattern to a time when the mold is stripped from the original pattern (strip time) by raising the hardening rate of the self-hardening mold after the filling.

Disclosed is, for example, a binder composition containing a hydrolyzable tannin and an aromatic aldehyde from the viewpoint of mold-producing performance (PTL 1).

Disclosed is also a binder composition containing a hydrolyzable tannin and a specific silane coupling agent from the viewpoints of storage stability as well as mold-producing performance (PTL 2).

Disclosed is also a method for producing a self-hardening resin for a mold by use of a furan-modified urea resin in order to decrease formaldehyde odor and give excellent storage stability and strength properties (PTL 3).

In the meantime, it is disclosed that, for example, 5-hydroxymethylfurfural as a compound alternative for furfuryl alcohol can decrease harmful matters or gases for a binder composition which does not substantially contain phenol, formaldehyde nor nitrogen (it means any amine-containing component such as urea), thereby improving the working environment (PTL 4).

CITATION LIST

Patent Literature

PTL 1: Patent 2011-45904
PTL 2: Patent 2011-62729
PTL 3: Patent S49-99696
PTL 4: Patent US 20080207796

SUMMARY OF INVENTION

Technical Problem

An improvement in the production performance of a mold cannot be made only by raising the hardening rate of the mold as described above. One out of requirements therefor is that the bench life is sufficiently kept with certainty. The bench life means a period from a time when a given quantity of a binder, a hardening agent and others are mixed with sand to a time when a usable mold can be made therefrom. For a mold having a complicated shape, or a mold for which a core metal or a chiller is used in a large quantity, the bench life needs to be made long. In the production of a mold by use of a conventional binder composition, in a case where the bench life is made long by decreasing the addition amount or concentration of a hardening agent, the hardening of the mold is slowed down so that the strip time tends to become long. The strip time denotes a period from a time when a given amount of a binder, a hardening agent and others are mixed with sand to a time when the mixture reaches into a predetermined strength (for example, 0.8 MPa) so that the original pattern becomes able to be stripped therefrom. Thus, for an improvement in the production performance of a mold having a complicated shape, desired is a binder giving a long bench life and a short strip time, that is, a binder making it possible to bring a short strip time when the binder brings the same bench life.

The other of the above-mentioned requirements is that a binder is desired which improves the mold in hardening rate to give sufficient and satisfactory final strength thereto.

However, binder compositions that have been hitherto suggested are each insufficient for the hardening rate and the strength of the mold. Moreover, the compositions are insufficient for making the bench life long and further the strip time short.

The present invention provides a binder composition for mold formation that can make the strip time short when this binder composition brings the same bench life, thereby being improved in mold-producing performance, and that can further improve the hardening rate and the mold strength; and a composition for a mold using the same.

Solution to Problem

The binder composition for mold formation of the present invention is a binder composition for mold formation comprising: one or more 5-position substituted furfural compounds selected from the group consisting of 5-hydroxymethylfurfural and 5-acetoxymethylfurfural (the one or more compounds may be referred to merely as 5-position substituted furfural compound(s) hereinafter); and a furfurylated urea resin.

The composition for a mold of the present invention is a composition for a mold wherein refractory particles, the above-mentioned binder composition for mold formation, and a hardening agent for furan resin that hardens the binder composition for mold formation are mixed with one another.

Advantageous Effects of Invention

The binder composition for mold formation of the present invention can make the strip time short when this binder composition brings the same bench life, thereby being improved in mold-producing performance, and can further improve the hardening rate and the mold strength. Moreover, the composition for a mold of the present invention can be made short in strip time when this composition has the same bench life, and can improve the hardening rate and the mold strength. Thus, this composition becomes good in mold-producing performance.

DESCRIPTION OF EMBODIMENTS

The binder composition for mold formation of the present invention (which may be referred to merely as a [binder composition] hereinafter) is a composition used as a binder when a mold is produced. The composition is a binder composition for mold formation comprising: one or more 5-position substituted furfural compounds selected from the group consisting of 5-hydroxymethylfurfural and 5-acetoxymethylfurfural; and a furfurylated urea resin. The binder composition of the present invention can make the strip time short when this binder composition brings the same bench life, thereby producing advantageous effects of improving the mold hardening rate and the mold strength. Although the reason why such advantageous effects are produced is unclear, the reason appears to be as follows:

5-Hydroxymethylfurfural has two groups of a methylol group and an aldehyde group. The methylol group has a single reaction point, and the aldehyde group has two reaction points so that 5-hydroxymethylfurfural has three reaction points in total. Additionally, the two functional groups are different from each other in reactivity. It is therefore considered that this compound has reaction points relatively high in reactivity and reaction points relatively low in reactivity. It is therefore assumed that the difference in reactivity between the two functional groups makes it possible to ensure a bench life, and further a crosslinking reaction from the linear polymer is advanced at a stretch since this furfural compound has the three reaction points, so that the mold is rapidly hardened. In the case of 5-acetoxymethylfurfural, it appears that this furfural compound acts with a hardening agent to be hydrolyzed to 5-hydroxymethylfurfural so that this compound contributes to the mold hardening rate and the mold strength. Furthermore, the furfurylated urea resin has at its terminal a furfuryl group; thus, reactions thereof with the two functional groups of 5-hydroxymethylfurfural would tend to be smoothly advanced. Additionally, the resin easily dissolves 5-hydroxymethylfurfural, so that the resin can react uniformly and effectively therewith. For this reason, in a system containing hydroxymethylfurfural, it is considered that the crosslinking reaction would advance easily to make it possible to improve the mold hardening rate and the mold strength. Hereinafter, the components contained in the binder composition of the present invention will be described later.

<Binder Composition for Mold Formation>

<One or more 5-Position Substituted Furfural Compounds Selected from the Group Consisting of 5-Hydroxymethylfurfural and 5-Acetoxymethylfurfural>

The binder composition of the present invention comprises one or more 5-position substituted furfural compounds selected from the group consisting of 5-hydroxymethylfurfural and 5-acetoxymethylfurfural from the viewpoint of making the strip time short when this binder composition brings the same bench life, and from the viewpoint of improving the hardening rate and the mold strength.

The content of the 5-position substituted furfural compound(s) selected from the group consisting of 5-hydroxymethylfurfural and 5-acetoxymethylfurfural in the binder composition is preferably 1% by weight or more, more preferably 2% by weight or more, even preferably 5% by weight or more, even more preferably 6% by weight or more, even more preferably 7% by weight or more, and further the content is preferably 30% by weight or less, more preferably 20% by weight or less, even preferably 15% by weight or less, even more preferably 10% by weight or less from the viewpoint of making the strip time short when this binder composition brings the same bench life, from the viewpoint of improving the hardening rate and from the viewpoint of improving the mold strength.

The one or more 5-position substituted furfural compounds selected from the group consisting of 5-hydroxymethylfurfural and 5-acetoxymethylfurfural are contained in the binder composition in a proportion preferably from 1 to 30% by weight, more preferably from 2 to 20% by weight, even preferably from 5 to 10% by weight from the viewpoint of making the strip time short when this binder composition brings the same bench life. The 5-position substituted furfural compound(s) is/are contained in the binder composition in a proportion preferably from 6 to 30% by weight, more preferably from 7 to 20% by weight, even preferably from 7 to 15% by weight from the viewpoint of improving the hardening rate and the mold strength. The 5-position substituted furfural compound(s) is/are contained in the binder composition in a proportion preferably from 5 to 30% by weight, more preferably from 6 to 20% by weight, even preferably from 7 to 15% by weight from the viewpoint of making the strip time short when this binder composition brings the same bench life, and from the viewpoint of improving the hardening rate and the mold strength.

The 5-position substituted furfural compound(s) is/are preferably 5-hydroxymethylfurfural from the viewpoint of making the strip time short when this binder composition brings the same bench life, and from the viewpoint of improving the hardening rate and the mold strength.

The content of 5-hydroxymethylfurfural in the binder composition is preferably 1% by weight or more, more preferably 2% by weight or more, even preferably 5% by weight or more, even more preferably 6% by weight or more, even more preferably 7% by weight or more, and is preferably 30% by weight or less, more preferably 20% by weight or less, even preferably 15% by weight or less, even more preferably 10% by weight or less from the viewpoint of making the strip time short when this binder composition brings the same bench life, from the viewpoint of improving the hardening rate and from the viewpoint of improving the mold strength.

5-Hydroxymethylfurfural is contained in the binder composition in a proportion preferably from 1 to 30% by weight, more preferably from 2 to 20% by weight, even preferably from 5 to 10% by weight from the viewpoint of making the strip time short when this binder composition brings the same bench life. 5-Hydroxymethylfurfural is contained in the binder composition in a proportion preferably from 6 to 30% by weight, more preferably from 7 to 20% by weight, even preferably from 7 to 15% by weight from the viewpoint of improving the hardening rate and the mold strength. 5-Hydroxymethylfurfural is contained in the binder composition in a proportion preferably from 5 to 30% by weight, more preferably from 6 to 20% by weight, even preferably from 7 to 15% by weight from the viewpoint of making the strip time short when this binder composition brings the same bench life, and from the viewpoint of improving the hardening rate and the mold strength.

5-Hydroxymethylfurfural may be used together with 5-acetoxymethylfurfural.

<Furfurylated Urea Resin>

The binder composition of the present invention contains a furfurylated urea resin from the viewpoint of making the strip time short when this binder composition brings the same bench life, and from the viewpoint of improving the hardening rate and the mold strength.

The furfurylated urea resin is characterized by having, in the molecule thereof, a structure originating from urea, a furfuryl ring, and a methylene group that may have a substituent. The furfurylated urea resin is preferably a condensed product made from furfuryl alcohol, urea and an aldehyde from the viewpoint of making the strip time short when this binder composition brings the same bench life, and from the viewpoint of improving the hardening rate and the mold strength. Examples of the aldehyde include formaldehyde, acetaldehyde, glyoxal, furfural, terephthalaldehyde and the like.

The furfurylated urea resin is more preferably a condensed product made from furfuryl alcohol, urea and formaldehyde.

The furfurylated urea resin can be obtained by causing furfuryl alcohol and urea to react with an aldehyde such as formaldehyde, acetaldehyde, glyoxal, furfural, terephthalaldehyde and the like, and can be preferably obtained by causing furfuryl alcohol, urea, and formaldehyde to react with one another.

The furfurylated urea resin may be obtained, for example, by causing 0.6 to 30 parts by weight of urea and 0.4 to 40 parts by weight of formaldehyde to react with 100 parts by weight of furfuryl alcohol. From the viewpoint of making the strip time short when this binder composition brings the same bench life, and from the viewpoint of improving the hardening rate and the mold strength, preferably, 1.0 to 25 parts by weight of urea and 1.0 to 35 parts by weight of formaldehyde are caused to react with 100 parts by weight of furfuryl alcohol, and more preferably 1.5 to 20 parts by weight of urea and 1.5 to 30 parts by weight of formaldehyde are caused to react therewith.

In the furfurylated urea resin, the respective ratios by mole of formaldehyde and urea to each mole of furfuryl alcohol, which is a monomer component constituting the resin, are preferably from 0.5 to 8 moles and from 0.2 to 4 moles, more preferably from 0.7 to 4 moles and from 0.4 to 2 moles, even preferably from 1 to 3 moles and from 0.7 to 1.5 moles from the viewpoint of making the strip time short when this binder composition brings the same bench life, and from the viewpoint of improving the hardening rate and the mold strength.

The content of the furfurylated urea resin in the binder composition is preferably 1% by weight or more, more preferably 2% by weight or more, even preferably 4% by weight or more, even more preferably 6% by weight or more, and is preferably 20% by weight or less, more preferably 15% by weight or less, even preferably 10% by weight or less, even more preferably 8% by weight or less, even more preferably 6% by weight or less from the viewpoint of making the strip time short when this binder composition brings the same bench life, from the viewpoint of improving the hardening rate and from the viewpoint of improving the mold strength.

The furfurylated urea resin is contained in the binder composition in a proportion preferably from 1 to 20% by weight, more preferably from 1 to 15% by weight, even preferably from 2 to 10% by weight from the viewpoint of improving the hardening rate and the mold strength. The resin is contained in a proportion preferably from 4 to 6% by weight from the viewpoint of improving the hardening rate, and is contained in a proportion preferably from 6 to 8% by weight from the viewpoint of improving the mold strength.

The ratio by weight of the 5-position substituted furfural compound(s) to the furfurylated urea resin [5-position substituted furfural compound(s)/furfurylated urea resin (ratio by weight)] is preferably 0.5 or more, more preferably 0.7 or more, and is preferably 5.0 or less, more preferably 4.5 or less from the viewpoint of making the strip time short when this binder composition brings the same bench life, and from the viewpoint of improving the hardening rate and the mold strength.

The ratio by weight of the 5-position substituted furfural compound(s) to the furfurylated urea resin is preferably from 0.5 to 5.0, more preferably from 0.7 to 4.5 from the viewpoint of making the strip time short when this binder composition brings the same bench life, and from the viewpoint of improving the hardening rate and the mold strength.

The ratio by weight of 5-hydroxymethylfurfural to the furfurylated urea resin [5-hydroxymethylfurfural/furfurylated urea resin (ratio by weight)] is preferably 0.5 or more, more preferably 0.7 or more, and is preferably 5.0 or less, more preferably 4.5 or less from the viewpoint of making the strip time short when this binder composition brings the same bench life, and from the viewpoint of improving the hardening rate and the mold strength.

The ratio by weight of 5-hydroxymethylfurfural to the furfurylated urea resin [5-hydroxymethylfurfural/furfurylated urea resin (ratio by weight)] is preferably from 0.5 to 5.0, more preferably from 0.7 to 4.5 from the viewpoint of making the strip time short when this binder composition brings the same bench life, and from the viewpoint of improving the hardening rate and the mold strength.

<Furfuryl Alcohol>

Since furfuryl alcohol is used as a solvent at the time of synthesizing the furfurylated urea resin, this alcohol remains, in the form of a monomer thereof, together with the produced furfurylated urea resin. The binder composition of the present invention contains furfuryl alcohol in this form; however, in order to adjust the viscosity of the binder composition to an appropriate value, furfuryl alcohol may newly be added thereto. The content of the furfuryl alcohol in the binder composition is preferably 50% by weight or more, more preferably 60% by weight or more, and is preferably 95% by weight or less, more preferably 90% by weight or less, even preferably 70% by weight or less. The content of the furfuryl alcohol in the binder composition is preferably from 50 to 95% by weight, more preferably from 60 to 90% by weight. The content is even preferably from 60 to 70% by weight from the viewpoint of improving the mold strength.

<Acid-Hardening Resin other than the Furfurylated Urea Resin>

As an acid-hardening resin other than the furfurylated urea resin, a conventionally known resin may be used. The resin may be, for example, one selected from the group consisting of furfuryl alcohol, a condensed product made from furfuryl alcohol and an aldehyde, a condensed product made from a phenol and an aldehyde, a condensed product made from melamine and an aldehyde, and a condensed product made from urea and an aldehyde, or a mixture composed of two or more selected from this group. The resin may be a co-condensed product composed of two or more selected from this group. Of these examples, preferred are one or more selected from furfuryl alcohol, a condensed product made from furfuryl alcohol and an aldehyde, and a condensed product made from urea and an aldehyde, and co-condensed products of these preferred examples from the viewpoint of making the binder composition into an appropriate viscosity. Furfuryl alcohol can be produced from plants, which are non-petroleum resources; thus, it is preferred from the viewpoint of global environment to use furfuryl alcohol, and a condensed product made from furfuryl alcohol and an aldehyde. It is preferred from the viewpoint of costs to use a condensed product made from urea and an aldehyde, and a co-condensed product of a condensed product made from urea and an aldehyde, and furfuryl alcohol; and the aldehyde is more preferably formaldehyde. From the viewpoint of the mold hardening rate, it is preferred to use a condensed product made from melamine and an aldehyde, and a co-condensed product of a condensed product made from melamine and an aldehyde, and furfuryl alcohol, and it is more preferred to use a condensed product made from melamine and formaldehyde. When these viewpoints are synthetically considered, a condensed product made from urea and an aldehyde is preferred and a condensed product made from urea and formaldehyde is more preferred.

The content of the acid-hardening resin other than the furfurylated urea resin in the binder composition is preferably 4% by weight or more, more preferably 6% by weight or more, even preferably 10% by weight or more, and is preferably 30% by weight or less, more preferably 25% by weight or less, even preferably 20% by weight or less from the viewpoint of the handleability thereof by adjusting the viscosity to an appropriate value.

The content of the acid-hardening resin other than the furfurylated urea resin in the binder composition is preferably from 4 to 30% by weight, more preferably from 6 to 25% by weight, even preferably from 10 to 20% by weight from the viewpoint of the handleability by adjusting the viscosity to an appropriate value.

In the binder composition of the present invention, the nitrogen content in the binder composition is preferably 0.5% by weight or more, more preferably 0.8% by weight or more, even preferably 1.0% by weight or more from the viewpoint of improving the strength of the resultant mold. The nitrogen content in the binder composition is preferably 5.0% by weight or less, more preferably 4.5% by weight or less, even preferably 4.0% by weight or less from the viewpoint of preventing gas defects in the mold that originates from nitrogen. When these viewpoints are synthetically considered, the nitrogen content in the binder composition is preferably from 0.5 to 5.0% by weight, more preferably from 0.8 to 4.5% by weight, even preferably from 1.0 to 4.0% by weight. In order to adjust the nitrogen content in the binder composition to the above-mentioned range, it is advisable to adjust the content of a nitrogen-containing compound in the binder composition. Examples of the nitrogen-containing compound include the furfurylated urea resin, and urea/aldehyde condensed products other than the furfurylated urea resin.

<Hardening Promoter>

The binder composition of the present invention may contain a hardening promoter from the viewpoint of improving the hardening rate and the mold strength. The hardening promoter may be a hardening promoter contained in the binder composition. Another hardening promoter may be added to the composition for a mold. The content of the hardening promoter in the binder composition is preferably 0.5% by weight or more, more preferably 1.8% by weight or more, even preferably 3.0% by weight or more, even more preferably 5.0% by weight or more, and is preferably 63% by weight or less, more preferably 50% by weight or less, even preferably 40% by weight or less, even more preferably 30% by weight or less from the viewpoint of the solubility of the hardening promoter in the furan resin, from the viewpoint of improving the hardening rate, and from the viewpoint of improving the mold strength.

The hardening promoter is preferably one or more selected from the group consisting of a compound represented by the following general chemical formula (1) (which is referred to as hardening promoter (1) hereinafter), a polyhydric phenol, and an aromatic dialdehyde from the viewpoint of improving the hardening rate and the mold strength:

[Chem. 1]

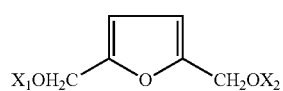

(1)

wherein $X_1$ and $X_2$ each represent any of a hydrogen atom, $CH_3$ or $C_2H_5$.

Examples of the hardening promoter (1) include 2,5-bis(hydroxymethyl)furan, 2,5-bis(methoxymethyl)furan, 2,5-bis(ethoxymethyl)furan, 2-hydroxymethyl-5-methoxymethylfuran, 2-hydroxymethyl-5-ethoxymethylfuran, and 2-methoxymethyl-5-ethoxymethylfuran. Of these examples, 2,5-bis(hydroxymethyl)furan is preferred from the viewpoint of improving the mold strength. The content of the hardening promoter (1) in the binder composition is preferably from 0.5 to 63% by weight, more preferably from 1.8 to 50% by weight, even preferably from 3.0 to 40% by weight, even more preferably from 5.0 to 30% by weight from the viewpoint of the solubility of the hardening promoter (1) in the furan resin, from the viewpoint of improving the hardening rate, and from the viewpoint of improving the mold strength.

The content of 2,5-bis(hydroxymethyl)furan is preferably 0.5% by weight or more, more preferably 1.0% by weight or more, even preferably 2.0% by weight or more, even more preferably 3.0% by weight or more, even more preferably 5.0% by weight or more, even more preferably 7.0% by weight or more, even more preferably 10.0% by weight or more, and is preferably 63% by weight or less, more preferably 50% by weight or less, even preferably 40% by weight or less, even more preferably 30% by weight or less, even more preferably 20% by weight or less, even more preferably 10% by weight or less, even more preferably 7% by weight or less from the viewpoint of the solubility of 2,5-bis(hydroxymethyl)furan in the furan resin, from the viewpoint of improving the hardening rate, and from the viewpoint of improving the mold strength. The content of 2,5-bis(hydroxymethyl)furan is preferably from 0.5 to 63% by weight, more preferably from 1.0 to 50% by weight, even preferably from 2.0 to 40% by weight from the viewpoint of improving the hardening rate and from the viewpoint of improving the mold strength.

The content of 2,5-bis(hydroxymethyl)furan is preferably from 5.0 to 40% by weight, more preferably from 7.0 to 30% by weight, even preferably from 10 to 20% by weight from the viewpoint of improving the hardening rate.

The content of 2,5-bis(hydroxymethyl)furan is preferably from 3.0 to 20% by weight, more preferably from 3.0 to 10% by weight, even preferably from 3.0 to 7.0% by weight from the viewpoint of improving the mold strength.

The ratio by weight of the 5-position substituted furfural compound(s) to 2,5-bis(hydroxymethyl)furan [5-position substituted furfural compound(s)/2,5-bis(hydroxymethyl)furan (ratio by weight)] is preferably 0.1 or more, more preferably 0.2 or more, and is preferably 5 or less, more preferably 4 or less from the viewpoint of improving the hardening rate and from the viewpoint of improving the mold strength.

The ratio by weight of 5-hydroxymethylfurfural to 2,5-bis(hydroxymethyl)furan is preferably from 0.1 to 5, more preferably from 0.2 to 4 from the viewpoint of improving the hardening rate and from the viewpoint of improving the mold strength.

The ratio by weight of 2,5-bis(hydroxymethyl)furan to the furfurylated urea resin [2,5-bis(hydroxymethyl)furan/furfurylated urea resin (ratio by weight)] is preferably 0.2 or more, more preferably 0.3 or more, even preferably 0.5 or more, even more preferably 0.6 or more, and is preferably 2.5 or less, preferably 1.5 or less, even preferably 1.4 or less, even more preferably 1.0 or less, even more preferably 0.7 or less, even more preferably 0.5 or less from the viewpoint of improving the hardening rate and from the viewpoint of improving the mold strength.

The ratio by weight of 2,5-bis(hydroxymethyl)furan to the furfurylated urea resin [2,5-bis(hydroxymethyl)furan/furfurylated urea resin (ratio by weight)] is preferably from 0.2 to 2.5, more preferably from 0.3 to 1.5 from the viewpoint of improving the hardening rate and from the viewpoint of improving the mold strength.

The ratio by weight of 2,5-bis(hydroxymethyl)furan to the furfurylated urea resin [2,5-bis(hydroxymethyl)furan/furfurylated urea resin (ratio by weight)] is preferably from 0.5 to 1.5, more preferably from 0.6 to 1.4 from the viewpoint of improving the hardening rate.

The ratio by weight of 2,5-bis(hydroxymethyl)furan to the furfurylated urea resin [2,5-bis(hydroxymethyl)furan/furfurylated urea resin (ratio by weight)] is preferably from 0.3 to 1.0, more preferably from 0.3 to 0.7, even preferably from 0.3 to 0.5 from the viewpoint of improving the mold strength.

Examples of the polyhydric phenolic compound include resorcin, cresol, hydroquinone, phloroglucinol, methylenebisphenol, condensed tannins, hydrolyzable tannins and the like. Of these examples, resorcin is preferred from the viewpoint of improving the mold strength. The content of the polyhydric phenolic compound in the binder composition is preferably from 1 to 25% by weight, more preferably from 2 to 15% by weight, even preferably from 3 to 10% by weight from the viewpoint of the solubility of the polyhydric phenolic compound in the furan resin and from the viewpoint of improving the mold strength. When resorcin is used out of these examples, the content of resorcin in the binder composition is preferably 1% by weight or more, more preferably 2% by weight or more, even preferably 3% by weight or more, and is preferably 10% by weight or less, more preferably 7% by weight or less, even preferably 6% by weight or less from the viewpoint of the solubility of resorcin in the furan resin and from the viewpoint of improving the final mold strength. The content of resorcin in the binder composition is preferably from 1 to 10% by weight, more preferably from 2 to 7% by weight, even preferably from 3 to 6% by weight from the viewpoint of the solubility of resorcin in the furan resin and from the viewpoint of improving the final mold strength.

Examples of the aromatic dialdehyde include terephthalaldehyde, phthalaldehyde, isophthalaldehyde and the like; and derivatives thereof, and the like. The content of the aromatic dialdehyde in the binder composition is preferably from 0.1 to 15% by weight, more preferably from 0.5 to 10% by weight, even preferably from 1 to 5% by weight from the viewpoint of dissolving the aromatic dialdehyde sufficiently into the furan resin and from the viewpoint of restraining an odor of the aromatic dialdehyde itself.

<Water>

The binder composition of the present invention may further contain water. For example, in the case of synthesizing various condensed products such as a condensed product made from furfuryl alcohol and an aldehyde, a raw material in the form of an aqueous solution is used, or condensation water is generated so that the condensed product is usually yielded in the form of a mixture of the product and water. When such a condensed product is used in the binder composition, it is unnecessary that the water originating from the process of the synthesis dares to be removed. Water may be further added thereto for the purpose of making the binder composition into an easily-handleable viscosity, or for some other purpose. However, if the water content becomes excessive, it is feared that the hardening reaction of the acid-hardening resin is hindered. Thus, the water content in the binder composition is preferably 0.5% by weight or more, more preferably 1.0% by weight or more, and is preferably 30% by weight or less, more preferably 5% by weight or less, even preferably 3.5% by weight or less. The water content in the binder composition is preferably set into the range of 0.5 to 30% by weight. The content thereof is more preferably from 0.5 to 5% by weight, even preferably from 1.0 to 3.5% by weight from the viewpoint of making the binder composition easily-handleable and from the viewpoint of keeping the hardening reaction rate.

<Other Additives>

The binder composition may further contain therein additives such as a silane coupling agent and the like. When the composition contains, for example, a silane coupling agent, the strength of the resultant mold can be favorably improved. Usable examples of the silane coupling agent include aminosilanes such as N-b-(aminoethyl)-g-aminopropylmethyldimethoxysilane, N-b-(aminoethyl)-g-aminopropyltrimethoxysilane, N-b-(aminoethyl)-g-aminopropyltriethoxysilane 3-aminopropyltrimethoxysilane and the like; epoxysilanes such as 3-glycidoxypropyltrimethoxysilane, 3-glycidoxypropyltriethoxysilane, 3-glycidoxypropylmethyldiethoxysilane, 3-glycidoxypropyltriethoxysilane and the like, ureidosilanes, mercaptosilanes, sulfidesilanes, methacryloxysilanes, acryloxysilanes and the like. Preferred are aminosilanes, epoxysilanes and ureidosilanes. More preferred are aminosilanes and epoxysilanes. Even preferred are aminosilanes. Of the aminosilanes, preferred is N-b-(aminoethyl)-g-aminopropylmethyldimethoxysilane. The content of the silane coupling agent in the binder composition is preferably from 0.01 to 0.5% by weight, more preferably from 0.05 to 0.3% by weight from the viewpoint of the mold strength.

<Composition for Mold>

The binder composition of the present invention may be mixed with refractory particles and a hardening agent to prepare a composition for a mold. The composition for a mold of the present invention comprises the binder composition of the present invention, refractory particles and a hardening agent.

The binder composition of the present invention is used suitably for producing a mold.

The refractory particles may be conventionally known particles such as silica sand, chromite sand, zircon sand, olivine sand, alumina sand, mullite sand, synthetic mullite sand and the like. The particles may be particles obtained by collecting used refractory particles, or subjecting the used particles to reclaiming treatment, or other particles.

The hardening agent is a hardening agent for hardening the binder composition of the present invention. Specific examples thereof include sulfonic acid-based compounds such as xylenesulfonic acid (particularly, m-xylenesulfonic acid), toluenesulfonic acid (particularly, p-toluenesulfonic acid) and the like; phosphoric acid compounds; sulfuric acid and the like. These compounds are preferably in the form of an aqueous solution from the viewpoint of handleability. It is allowable to incorporate, into the hardening agent, one or more solvents selected from the group consisting of alcohols, ether alcohols and esters, or a carboxylic acid.

In the composition for a mold of the present invention, the ratio between the refractory particles, the binder composition and the hardening agent may be appropriately set. From the viewpoint of improving the hardening rate and the mold strength, it is preferred that the amounts of the binder composition and the hardening agent are from 0.5 to 1.5 parts by weight and from 0.07 to 1 part by weight, respectively, based on 100 parts by weight of the refractory particles. In connection with the ratio by weight between the binder composition and the hardening agent, the amount of the hardening agent is preferably from 20 to 60 parts by weight, more preferably from 30 to 50 parts by weight based on 100 parts by weight of the binder composition from the viewpoint of improving the hardening rate and the mold strength.

<Method for Producing Mold>

A mold can be produced by hardening the composition for a mold of the present invention. In the method for producing a mold of the present invention, a mold can be produced, using a conventional mold producing process as it is.

The composition of the present invention is:

<1> a binder composition for mold formation comprising: one or more 5-position substituted furfural compounds selected from the group consisting of 5-hydroxymethylfurfural and 5-acetoxymethylfurfural; and a furfurylated urea resin.

Furthermore, the present invention is preferably the following composition, production method, or use.

<2> The binder composition for mold formation according to item <1>, wherein the content of the 5-position substituted furfural compound(s) is 1% by weight or more, preferably 2% by weight or more, more preferably 5% by weight or more, even preferably 6% by weight or more, even more preferably 7% by weight or more, and is 30% by weight or less, preferably 20% by weight or less, more preferably 15% by weight or less, even preferably 10% by weight or less.

<3> The binder composition for mold formation according to item <1> or <2>, wherein the content of the 5-position substituted furfural compound(s) is from 1 to 30% by weight, preferably from 2 to 20% by weight, more preferably from 5 to 10% by weight.

<4> The binder composition for mold formation according to any one of items <1> to <3>, wherein the content of the 5-position substituted furfural compound(s) is from 6 to 30% by weight, preferably from 7 to 20% by weight, more preferably from 7 to 15% by weight.

<5> The binder composition for mold formation according to any one of items <1> to <3>, wherein the content of the 5-position substituted furfural compound(s) is from 5 to 30% by weight, preferably from 6 to 20% by weight, more preferably from 7 to 15% by weight.

<6> The binder composition for mold formation according to any one of items <1> to <5>, wherein the content of the furfurylated urea resin is 1% by weight or more, preferably 2% by weight or more, more preferably 4% by weight or more, even preferably 6% by weight or more, and is 20% by weight or less, preferably 15% by weight or less, more preferably 10% by weight or less, even preferably 8% by weight or less, even more preferably 6% by weight or less.

<7> The binder composition for mold formation according to any one of items <1> to <6>, wherein the content of the furfurylated urea resin is from 1 to 20% by weight, preferably from 1 to 15% by weight, more preferably from 2 to 10% by weight, even preferably from 4 to 6% by weight, even more preferably from 6 to 8% by weight.

<8> The binder composition for mold formation according to any one of items <1> to <7>, wherein the ratio by weight of the 5-position substituted furfural compound(s) to the furfurylated urea resin [5-position substituted furfural compound(s)/furfurylated urea resin (ratio by weight)] is 0.5 or more, preferably 0.7 or more, and is 5.0 or less, preferably 4.5 or less.

<9> The binder composition for mold formation according to any one of items <1> to <8>, wherein the ratio by weight of 5-hydroxymethylfurfural to the furfurylated urea resin [5-hydroxymethylfurfural/furfurylated urea resin (ratio by weight)] is 0.5 or more, preferably 0.7 or more, and is 5.0 or less, preferably 4.5 or less.

<10> The binder composition for mold formation according to any one of items <1> to <9>, wherein the ratio by weight of 5-hydroxymethylfurfural to the furfurylated urea resin [5-hydroxymethylfurfural/furfurylated urea resin (ratio by weight)] is from 0.5 to 5.0, preferably from 0.7 to 4.5.

<11> The binder composition for mold formation according to any one of items <1> to <10>, wherein the furfurylated urea resin is a furfuryl alcohol/urea/formaldehyde condensed product.

<12> The binder composition for mold formation according to any one of items <1> to <11>, wherein the furfurylated urea resin is a resin synthesized in the presence of urea and formaldehyde in furfuryl alcohol.

<13> The binder composition for mold formation according to any one of items <1> to <12>, wherein the content of the furfuryl alcohol is 50% by weight or more, preferably 60% by weight or more, and is 95% by weight or less, preferably 90% by weight or less, more preferably 70% by weight or less.

<14> The binder composition for mold formation according to any one of items <1> to <13>, wherein the content of an acid-hardening resin other than the furfurylated urea resin is 4% by weight or more, preferably 6% by weight or more, more preferably 10% or more, and is 30% by weight or less, preferably 25% by weight or less, more preferably 20% by weight or less.

<15> The binder composition for mold formation according to any one of items <1> to <14>, further comprising a hardening promoter.

<16> The binder composition for mold formation according to any one of items <1> to <15>, wherein the content of the hardening promoter is 0.5% by weight or more, preferably 1.8% by weight or more, more preferably 3.0% by weight or more, even preferably 5.0% by weight or more, and is 63% by weight or less, preferably 50% by weight or less, more preferably 40% by weight or less, even preferably 30% by weight or less.

<17> The binder composition for mold formation according to any one of items <1> to <16>, wherein the hardening promoter is one or more selected from the group consisting of 2,5-bis(hydroxymethyl)furan and resorcin.

<18> The binder composition for mold formation according to any one of items <1> to <17>, wherein the hardening promoter is 2,5-bis(hydroxymethyl)furan, and the content of 2,5-bis(hydroxymethyl)furan is preferably 0.5% by weight or more, more preferably 1.0% by weight or more, even preferably 2.0% by weight or more, even more preferably 3.0% by weight or more, even more preferably 5.0% by weight or more, even more preferably 7.0% by weight or more, even more preferably 10% by weight or more, and is preferably 63% by weight or less, more preferably 50% by weight or less, even preferably 40% by weight or less, even more preferably 30% by weight or less, even more preferably 20% by weight or less, even more preferably 10% by weight or less, even more preferably 7% by weight or less.

<19> The binder composition for mold formation according to any one of items <1> to <18>, wherein the ratio by weight of the 5-position substituted furfural compound(s) to 2,5-bis(hydroxymethyl)furan [5-position substituted furfural compound(s)/2,5-bis(hydroxymethyl)furan (ratio by weight)] is 0.1 or more, preferably 0.2 or more, and is 5 or less, preferably 4 or less.

<20> The binder composition for mold formation according to any one of items <1> to <19>, wherein the ratio by weight of 2,5-bis(hydroxymethyl)furan to the furfurylated urea resin [2,5-bis(hydroxymethyl)furan/furfurylated urea resin (ratio by weight)] is 0.2 or more, preferably 0.3 or more, more preferably 0.5 or more, even preferably 0.6 or more, and is 2.5 or less, preferably 1.5 or less, even preferably 1.4 or less, even more preferably 1.0 or less, even more preferably 0.7 or less, even more preferably 0.5 or less.

<21> The binder composition for mold formation according to any one of items <1> to <20>, wherein the hardening promoter is resorcin, and the content of resorcin is preferably 1% by weight or more, more preferably 2% by weight or more, even preferably 3% by weight or more, and is preferably 10% by weight or less, more preferably 7% by weight or less, even preferably 6% by weight or less.

<22> The binder composition for mold formation according to any one of items <1> to <21>, wherein the water content is 0.5% by weight or more, preferably 1.0% by weight or more, and is 30% by weight or less, preferably 5% by weight or less, more preferably 3.5% by weight or less.

<23> The binder composition for mold formation according to any one of items <1> to <22>, wherein the 5-position substituted furfural compound is 5-hydroxymethylfurfural.

<24> A composition for a mold, wherein refractory particles, the binder composition for mold formation recited in any one of items <1> to <23>, and a hardening agent for hardening the binder composition for mold formation are mixed with one another.

<25> Use of the binder composition for mold formation recited in any one of items <1> to <23> for producing a mold.

<26> A method for producing a mold, comprising a step of hardening the composition for a mold recited in item <24>.

EXAMPLES

Hereinafter, a description will be made regarding examples demonstrating the present invention specifically, and others. In the examples and the others, regarding evaluation items, measurements were made as follows:

<Nitrogen Content in Binder Composition>

The nitrogen content was measured by Kjeldahl method described in JIS M 8813. Regarding each of Examples 1, 3 to 5, 9, 10, 12, 13 and 17 to 25, and Comparative Examples 1, 4, 6, 9, 13, 15 and 17, the percentage by weight of nitrogen in the binder composition was 3.00% by weight; regarding each of Examples 6 and 14, the percentage was 2.00% by weight; regarding each of Examples 2, 7, 8, 11, 15 and 26, and Comparative Examples 2, 5, 7 and 10, the percentage was 1.00% by weight; regarding Example 27, the percentage was 4.00% by weight; and regarding each of Comparative Examples 3, 8, 11, 12, 14 and 16, the percentage was 0.00% by weight.

<Furfuryl Alcohol Content in Binder composition>

The content was measured by gas chromatography. Furfuryl alcohol was used to prepare a calibration curve.

Measuring Conditions:

Internal standard solution: 1,6-hexanediol

Column: PEG-20M Chromosorb WAW DMCS 60/80 mesh (manufactured by GL Sciences Inc.)

Column temperature: 80 to 200 [degrees Celsius] (8 [degrees Celsius]/min)

([degrees Celsius] may be referred to merely as a [deg C.] hereinafter)

Injection temperature: 210 [deg C.]

Detector temperature: 250 [deg C.]

Carrier gas: 50 mL/min (He)

<Furfurylated Urea Resin Content in Each of Condensed Products 1 to 5>

13C-NMR (quantitative mode, the number of times of accumulation: 2000, solvent: deuterated DMSO) was used to measure each of condensed products 1 to 5. From the ratio between the integral values of methylene carbon atoms at 36 to 37 and 70 to 71 ppm, and the integral value at the 3 position (or 4 position) of furfuryl alcohol, the content thereof was calculated out.

<Water Content in Binder Composition>

The water content was measured by a method described in JIS K 0068 for testing the water content in a chemical product.

<Acid Value (AV) of Hardening Agent>

The acid value was measured by an acid value measuring method described in JIS K 0070.

<Ratio by Mole between Monomers in Each of Condensed Products 1 and 5>

13C-NMR was used to measure the content of the structure originating from each of furfuryl alcohol, formaldehyde and urea, which constituted each of the condensed products, to calculate out the ratio by mole between furfuryl alcohol, formaldehyde, and urea.

<Production of Condensed Product 1>

Into a three-necked flask were charged 100 parts by weight of furfuryl alcohol, 35 parts by weight of paraformaldehyde, and 13 parts by weight of urea, and then the pH of the resultant was adjusted to 9 with a 25% solution of sodium hydroxide in water. The temperature thereof was raised to 100 [deg C.], and then the reactive components were caused to react with each other at the same temperature for 1 hour. Thereafter, the pH thereof was adjusted to 4.5 with 37% hydrochloric acid. Furthermore, the components were caused to react with each other at 100 [deg C.] for 1 hour. Thereafter, the pH thereof was adjusted to 7 with a 25% solution of sodium hydroxide in water. Thereto was added 5 parts by weight of urea, and the reactive components were caused to react with each other at 100 [deg C.] for 30 minutes. In this way, a reaction product 1 was yielded. An unreacted portion of furfuryl alcohol was analyzed by the above-mentioned analyzing method, and a portion obtained by removing the furfuryl alcohol unreacted portion from the resultant was defined as a condensed product 1. The composition of the condensed product 1 was as follows: the proportion of a furfurylated urea resin (ratio by mole of furfuryl alcohol/formaldehyde/urea was 1/2/1) was 20% by weight, that of a urea resin other than the furfurylated urea resin was 69% by weight, and that of water was 11% by weight. Each binder composition was yielded by blending the reaction product 1 with furfuryl alcohol, 5-hydroxymethylfurfural and/or 5-acetoxymethylfurfural, resorcin, and a silane coupling agent so as to give one out of compositions in Table 1 or 2.

<Production of Condensed Product 3>

Into a three-necked flask were charged 100 parts by weight of phenol (manufactured by Wako Pure Chemical Industries, Ltd.), and 83 parts by weight of a 50% solution of formaldehyde in water, and then the pH of the resultant was adjusted to 8.5 with a 48% solution of potassium hydroxide in water (manufactured by Toagosei Co., Ltd.). The reactive components were caused to react with each other at 80 [deg C.] for 2 hours to yield a reaction product 3. The composition thereof was as follows: the proportion of a phenolic resin (ratio by mole of formaldehyde/phenol was 1/1.3) was 72% by weight, and that of water was 28% by weight. Each binder composition was yielded by blending the reaction product 3 with furfuryl alcohol, 5-hydroxymethylfurfural, and a silane coupling agent so as to give one out of compositions in Table 2.

<Production of Condensed Product 4>

Into a three-necked flask was charged 100 parts by weight of furfuryl alcohol, and then the pH of the resultant was adjusted to 2 with 85% phosphoric acid (manufactured by Wako Pure Chemical Industries, Ltd.). The reactive components were caused to react with each other at 100 [deg C.] for 30 minutes to yield a reaction product 4. An unreacted portion of furfuryl alcohol was analyzed by the above-mentioned analyzing method, and a portion obtained by removing the furfuryl alcohol unreacted portion from the resultant was defined as a condensed product 4. The composition of the condensed product 4 was as follows: the proportion of a furfuryl alcohol condensed product was 96% by weight, and that of water was 4% by weight. Each binder composition was yielded by blending the reaction product 4 with furfuryl alcohol, 5-hydroxymethylfurfural, and a silane coupling agent so as to give one out of compositions in Table 2.

<Production of Condensed Product 5>

Into a three-necked flask were charged 100 parts by weight of furfuryl alcohol and 35 parts by weight of paraformaldehyde, and then the pH of the resultant was adjusted to 4.5 with acetic acid (manufactured by Wako Pure Chemical Industries, Ltd.).

The temperature thereof was raised to 100 [deg C.], and then the reactive components were caused to react with each other at the same temperature for 3 hours. Thereafter, thereto was added 18 parts by weight of urea, and the components were caused to react with each other at 100 [deg C.] for 30 minutes. In this way, a reaction product 5 was yielded. An unreacted portion of furfuryl alcohol was analyzed by the above-mentioned analyzing method, and a portion obtained by removing the furfuryl alcohol unreacted portion from the resultant was defined as a condensed product 5. The composition of the condensed product 5 was as follows: the proportion of a furfurylated urea resin (ratio by mole of furfuryl alcohol/formaldehyde/urea was 1/2/1) was 39% by weight, that of a urea resin other than the furfurylated urea resin was 52% by weight, and that of water was 9% by weight. Each binder composition was yielded by blending the reaction product 5 with furfuryl alcohol, 5-hydroxymethylfurfural, 2,5-bis(hydroxymethyl)furan, and a silane coupling agent so as to give one out of compositions in Table 3, 4 or 5.

Examples 1 to 9, and Comparative Examples 1 to 5

Bench Life

Under the condition of 25 [deg C.] and 55% RH, to 100 parts by weight of silica sand (Fremantle) was added 0.40 parts by weight of a xylenesulfonic acid/sulfuric acid-based hardening agent [mixture of a hardening agent, KAO LIGHTNER US-3, manufactured by Kao-Quaker Co., Ltd., and a hardening agent, KAO LIGHTNER C-21, manufactured by Kao-Quaker Co., Ltd]. Next, thereto was added 1.00 part by weight of each of the binder compositions shown in Table 1, and these components were mixed with each other to yield kneaded sand. Thereafter, the kneaded sand just after the kneading was filled into a test piece pattern in the form of a column 50 mm in diameter and 50 mm in height. After three hours elapsed, the test piece was stripped from the pattern. Furthermore, the test piece was allowed to stand still for 21 hours, and then the compressive strength (MPa) thereof was measured by a method described in JIS Z 2604-1976. The resultant measured value was defined as $S_1$. Separately, after each predetermined period elapsed just after the kneading, the kneaded sand was used to form the same test piece as described above. By the same method as described above, the compressive strength (MPa) was measured. The resultant measured value was defined as $S_2$. The following was defined as the bench life: the period elapsed from the time just after the kneading to a time when the test piece giving an $S_2/S_1$ value of 0.8 was formed (a time when the compressive strength $S_2$ permitting the $S_2/S_1$ value to be 0.8 was obtained).

In order that the bench life thereof would be 3 or 6 minutes, the mixing ratio between the hardening agents was beforehand adjusted by experiments. In the case of, for example, Example 1, the mixing ratio between the hardening agents was adjusted as follows: US-3/C-21=55%/45% (AV=372).

<Mold-Producing Performance (Strip Time)>

Under the condition of 25 [deg C.] and 55% RH, to 100 parts by weight of silica sand (Fremantle) was added 0.40 parts by weight of a hardening agent [mixture of a hardening agent, KAO LIGHTNER US-3, manufactured by Kao-Quaker Co., Ltd., and a hardening agent, KAO LIGHTNER C-21, manufactured by Kao-Quaker Co., Ltd]. Next, thereto was added 1.00 part by weight of each of the binder compositions shown in Table 1, and these components were mixed with each other to yield kneaded sand. At this time, in order that the bench life thereof would be 3 or 6 minutes, the mixing ratio between the hardening agents was beforehand adjusted by experiments. Thereafter, the kneaded sand just after the kneading was filled into each test piece pattern in the form of a column 50 mm in diameter and 50 mm in height. After the patterns were allowed to stand still for respective predetermined periods, the test piece was stripped from the pattern. The compressive strength (MPa) thereof was then measured by the method described in JIS Z 2604-1976. The following was defined as the strip time: the standstill period from the time just after the filling to a time when the resultant measured value initially reached 0.8 MPa after the standstill. As the strip time is smaller, the mold-producing performance is better when the bench life is equal to that of other sands.

| | Binder composition | | | | | | |
|---|---|---|---|---|---|---|---|
| | Condensed product | | Furfuryl alcohol | 5-Hydroxy-methylfurfural | 5-Acetoxy-methylfurfural | Resorcin | Silane coupling agent |
| | Species | (% by weight) | (% by weight) | (% by weight) | (% by weight) | (% by weight) | (% by weight) |
| Example 1 | Condensed product 1 | 24.25 | 70.60 | 5.00 | 0.00 | 0.00 | 0.15 |
| Example 2 | Condensed product 1 | 8.95 | 85.90 | 5.00 | 0.00 | 0.00 | 0.15 |
| Example 3 | Condensed product 1 | 24.25 | 65.60 | 10.00 | 0.00 | 0.00 | 0.15 |
| Example 4 | Condensed product 1 | 24.25 | 45.60 | 30.00 | 0.00 | 0.00 | 0.15 |
| Example 5 | Condensed product 1 | 24.25 | 70.60 | 5.00 | 0.00 | 0.00 | 0.15 |

-continued

| | | | | | | | |
|---|---|---|---|---|---|---|---|
| Example 6 | Condensed product 1 | 17.90 | 76.95 | 5.00 | 0.00 | 0.00 | 0.15 |
| Example 7 | Condensed product 1 | 8.95 | 85.90 | 5.00 | 0.00 | 0.00 | 0.15 |
| Example 8 | Condensed product 1 | 8.95 | 82.05 | 5.00 | 0.00 | 3.85 | 0.15 |
| Example 9 | Condensed product 1 | 24.25 | 65.60 | 0.00 | 10.00 | 0.00 | 0.15 |
| Comparative Example 1 | Condensed product 1 | 24.25 | 75.60 | 0.00 | 0.00 | 0.00 | 0.15 |
| Comparative Example 2 | Condensed product 1 | 6.95 | 90.90 | 0.00 | 0.00 | 0.00 | 0.15 |
| Comparative Example 3 | Condensed product 1 | 0.00 | 94.85 | 5.00 | 0.00 | 0.00 | 0.15 |
| Comparative Example 4 | Condensed product 2 | 20.27 | 74.58 | 5.00 | 0.00 | 0.00 | 0.15 |
| Comparative Example 5 | Condensed product 2 | 6.76 | 88.09 | 5.00 | 0.00 | 0.00 | 0.15 |

| | Furfurylated urea resin in binder composition (% by weight) | Water in binder composition (% by weight) | Bench life (minutes) | Strip time (minutes) |
|---|---|---|---|---|
| Example 1 | 6.66 | 3.02 | 3 | 20 |
| Example 2 | 2.22 | 1.11 | 3 | 19 |
| Example 3 | 6.66 | 3.01 | 3 | 21 |
| Example 4 | 6.66 | 2.98 | 3 | 27 |
| Example 5 | 6.66 | 3.02 | 6 | 42 |
| Example 6 | 4.44 | 2.06 | 6 | 44 |
| Example 7 | 2.22 | 1.11 | 6 | 43 |
| Example 8 | 2.22 | 1.11 | 6 | 37 |
| Example 9 | 6.66 | 3.01 | 3 | 29 |
| Comparative Example 1 | 6.66 | 2.90 | 3 | 46 |
| Comparative Example 2 | 2.22 | 0.97 | 3 | 37 |
| Comparative Example 3 | 0.00 | 0.16 | 6 | 73 |
| Comparative Example 4 | 0.00 | 6.73 | 6 | 60 |
| Comparative Example 5 | 0.00 | 2.24 | 6 | 54 |

* One part by weight of a binder composition and 0.4 parts by weight of a hardening agent were used based on 100 parts by weight of Fremantle new sand. The concentration of the hardening agent was adjusted so as to set the bench life to 3 or 6 minutes.
* Condensed product 1: the product contained 20% by weight of a furfurylated urea resin, 69% by weight of a urea resin other than the furfurylated urea resin, and 11% by weight of water.
* Condensed product 2: urea resin [UL-027, manufactured by J-CHEMICAL Inc.: urea resin wherein the ratio by mole of formaldehyde to urea is 2/1, the solid content is 67% (the balance: water), and no furfurylated urea resin is contained.]
* Silane coupling agent: N-β-(aminoethyl)-γ-aminopropylmethyldimethoxysilane Examples 10 to 16, and Comparative Examples 6 to 12

Hardening Rate and Final Strength

Under the condition of 25 [deg C.] and 55% RH, to 100 parts by weight of silica sand (Fremantle) was added 0.40 parts by weight of a hardening agent (hardening agent, KAO LIGHTNER US-3/C-21=40%/60% manufactured by Kao-Quaker Co., Ltd). Next, thereto was added 1.00 part by weight of each of the binder compositions shown in Table 2, and these components were mixed with each other to yield kneaded sand. Thereafter, the kneaded sand just after the kneading was filled into a test piece pattern in the form of a column 50 mm in diameter and 50 mm in height. After 1 hour elapsed, the test piece was stripped from the pattern. The compressive strength (MPa) thereof was then measured by the method described in JIS Z 2604-1976. This value was used as the [the compressive strength after 1 hour] for the guide of the hardening rate. The test piece prepared from the kneaded sand filled into a test piece pattern in the same way separately was stripped from the pattern after 3 hours elapsed. After 24 hours from the filling, the compressive strength (MPa) was then measured by the method described in JIS Z 2604-1976. The resultant value was defined as the [compressive strength after 24 hours]. As the numerical value is higher, the mold strength is higher.

TABLE 2

| | Binder composition | | | | | | | | Compressive strengths | |
|---|---|---|---|---|---|---|---|---|---|---|
| | Condensed product | | Furfuryl alcohol | 5-Hydroxymethyl-furfural | 5-Acetoxymethyl-furfural | Resorcin | Silane coupling agent | Furfurylated urea resin in binder composition | Water in binder composition | After 1 hour | After 24 hours |
| | Species | (% by weight) | (% by weight) | (% by weight) | (% by weight) | (% by weight) | (% by weight) | (% by weight) | (% by weight) | (MPa) | (MPa) |
| Example 10 | Condensed product 1 | 24.25 | 70.60 | 5.00 | 0.00 | 0.00 | 0.15 | 6.66 | 3.02 | 1.99 | 5.85 |
| Example 11 | Condensed product 1 | 8.95 | 85.90 | 5.00 | 0.00 | 0.00 | 0.15 | 2.22 | 1.11 | 1.37 | 5.18 |
| Example 12 | Condensed product 1 | 24.25 | 65.60 | 10.00 | 0.00 | 0.00 | 0.15 | 6.66 | 3.01 | 2.85 | 6.59 |
| Example 13 | Condensed product 1 | 24.25 | 45.60 | 30.00 | 0.00 | 0.00 | 0.15 | 6.66 | 2.98 | 2.72 | 6.11 |
| Example 14 | Condensed product 1 | 17.90 | 76.95 | 5.00 | 0.00 | 0.00 | 0.15 | 4.44 | 2.06 | 2.51 | 5.52 |
| Example 15 | Condensed product 1 | 8.95 | 82.05 | 5.00 | 0.00 | 3.85 | 0.15 | 2.22 | 1.11 | 2.51 | 5.50 |
| Example 16 | Condensed product 1 | 24.25 | 65.60 | 0.00 | 10.00 | 0.00 | 0.15 | 6.66 | 3.01 | 1.47 | 6.49 |
| Comparative Example 6 | Condensed product 1 | 24.25 | 75.60 | 0.00 | 0.00 | 0.00 | 0.15 | 6.66 | 3.03 | 0.88 | 5.52 |
| Comparative Example 7 | Condensed product 1 | 8.95 | 90.90 | 0.00 | 0.00 | 0.00 | 0.15 | 2.22 | 1.12 | 1.05 | 4.27 |
| Comparative Example 8 | Condensed product 1 | 0.00 | 94.85 | 5.00 | 0.00 | 0.00 | 0.15 | 0.00 | 0.16 | 0.90 | 3.49 |
| Comparative Example 9 | Condensed product 2 | 20.27 | 74.58 | 5.00 | 0.00 | 0.00 | 0.15 | 0.00 | 6.73 | 0.80 | 4.65 |
| Comparative Example 10 | Condensed product 2 | 6.76 | 88.09 | 5.00 | 0.00 | 0.00 | 0.15 | 0.00 | 2.24 | 0.99 | 4.24 |
| Comparative Example 11 | Condensed product 3 | 20.00 | 74.85 | 5.00 | 0.00 | 0.00 | 0.15 | 0.00 | 5.73 | 0.94 | 2.49 |
| Comparative Example 12 | Condensed product 4 | 17.60 | 77.25 | 5.00 | 0.00 | 0.00 | 0.15 | 0.00 | 0.84 | 0.94 | 3.24 |

*Examples 10-16, and Comparative Examples 6-12: one part by weight of a binder composition and 0.4 parts by weight of a hardening agent (US-3/C-21 = 40%/60%) were used based on 100 parts by weight of Fremantle new sand.
*Condensed product 1: the product contained 20% by weight of a furfurylated urea resin, 69% by weight of a urea resin other than the furfurylated urea resin, and 11% by weight of water.
*Condensed product 2: urea resin [UL-027, manufactured by J-CHEMICAL Inc: urea resin wherein the ratio by mole of formaldehyde to urea is 2/1, the solid content is 67% (the balance: water), and no furfurylated urea is contained.]
*Condensed product 3: the product contained 72% by weight of a phenolic resin, and 28% by weight of water.
*Condensed product 4: the product contained 96% by weight of a furfuryl alcohol condensed product, and 4% by weight of water.
*Silane coupling agent: N-β-(aminoethyl)-γ-aminopropylmethyldimethoxysilane Regarding the binker compositions in Tables 1 and 2, Examples 1, 5 and 10 were equal to one another in the blend ration between the individual components therein, as well as Examples 2, 7 and 11; Examples 3 and 12; Examples 4 and 13; Examples 6 and 14; Examples 8 and 15; and Examples 9 and 16. However, in each of these groups, the ratio between the two hardening agents used in production of the molds was varied. Comparative Examples 1 and 6 were equal to each other in the blend ratio between the individual components therein, as well as Comparative Examples 2 and 7; Comparative Examples 3 and 8; Comparative Examples 4 and 9; and Comparative Examples 5 and 10. However, the ratio between

Examples 17 to 25, and Comparative Example 13

Hardening Rate and Final Strength

Each kneaded sand was yielded and then measured about the compressive strengths thereof in the same way as in Examples 10 to 16, and Comparative Examples 6 to 12 except that one out of binder compositions shown in Table 3 was used and the ratio between the hardening agents US-3 and C-21 was changed as follows: US-3/C-21=15%/85%.

TABLE 3

| | Binder composition | | | | | | Furfurylated urea resin in binder composition furan (% by weight) | Compressive strengths | |
|---|---|---|---|---|---|---|---|---|---|
| | Condensed product | | Furfuryl alcohol (% by weight) | 5-Hydroxy-methyl-furfural (% by weight) | 2,5-Bis(hydroxy-methyl)furan (% by weight) | Silane coupling agent (% by weight) | | After 1 hour (MPa) | After 24 hours (MPa) |
| | Species | (% by weight) | | | | | | | |
| Example 17 | Condensed product 5 | 37.90 | 41.95 | 20.00 | 0.00 | 0.15 | 14.78 | 0.75 | 4.90 |
| Example 18 | Condensed product 5 | 37.90 | 36.95 | 20.00 | 5.00 | 0.15 | 14.78 | 1.11 | 7.02 |
| Example 19 | Condensed product 5 | 37.90 | 31.95 | 20.00 | 10.00 | 0.15 | 14.78 | 1.21 | 6.97 |
| Example 20 | Condensed product 5 | 37.90 | 21.95 | 20.00 | 20.00 | 0.15 | 14.78 | 1.10 | 6.53 |
| Example 21 | Condensed product 5 | 37.90 | 46.95 | 10.00 | 5.00 | 0.15 | 14.78 | 0.70 | 7.45 |
| Example 22 | Condensed product 5 | 37.90 | 41.95 | 10.00 | 10.00 | 0.15 | 14.78 | 1.03 | 7.22 |
| Example 23 | Condensed product 5 | 37.90 | 31.95 | 10.00 | 20.00 | 0.15 | 14.78 | 1.74 | 7.14 |
| Example 24 | Condensed product 5 | 37.90 | 46.95 | 5.00 | 10.00 | 0.15 | 14.78 | 0.69 | 7.53 |
| Example 25 | Condensed product 5 | 37.90 | 36.95 | 5.00 | 20.00 | 0.15 | 14.78 | 1.47 | 7.14 |
| Comparative Example 13 | Condensed product 5 | 37.90 | 61.95 | 0.00 | 0.00 | 0.15 | 14.78 | 0.00 | 4.48 |

*One part by weight of a binder composition and 0.4 parts by weight of a hardening agent (US-3/C-21 = 15%/85%) were used based an 100 parts by weight of Fremantle new sand.
*Condensed product 5: the product contained 39% by weight of a furfurylated urea resin, 52% by weight of a urea resin other than the furfurylated urea resin, and 9% by weight of water.
*Silane coupling agent N-β-(aminoethyl)-γ-aminopropylmethyldimethoxysilane the two hardening agents used in production of the molds was varied. In each of Examples 1 to 4 and Example 9 in Table 1, the respective composition proportions of the hardening agents were adjusted so that the bench life would be 3 minutes; in Examples 5 to 8, 6 minutes; Comparative Example 1 to 2, 3 minutes; and Comparative Examples 3 to 5, 6 minutes. On the other hand, in Examples 10 to 16 and Comparative Examples 6 to 12 in Table 2, the same hardening agent composition and concentration were used.

As is evident from comparison of Examples 1 to 4 and 9 with Comparative Examples 1 and 2, which had the same bench life, or Examples 5 to 8 with Comparative Examples 3 to 5, which also had the same bench life, the binder composition of the present invention is smaller in strip time to be excellent in mold-producing performance.

In Table 2, Examples 10 to 16 were larger in respective compressive strengths after 1 hour and after 24 hours than Comparative Examples 6 to 12; thus, the binder composition of the present invention is larger in hardening rate to be excellent in mold strength.

According to Table 3, further incorporation of 2,5-bis(hydroxymethyl)furan makes the respective compressive strengths after 1 hour and after 24 hours large. Thus, the incorporation of 2,5-bis(hydroxymethyl)furan further improves the binder composition of the present invention in hardening rate and mold strength.

Example 26, and Comparative Examples 14 to 15

Hardening Rate and Final Strength

Each kneaded sand was yielded and then measured about the compressive strengths thereof in the same way as in Examples 10 to 16, and Comparative Examples 6 to 12 except that one out of binder compositions shown in Table 4 was used and the ratio between the hardening agents US-3 and C-21 was changed as follows: US-3/C-21=15%/85%. The results are shown in Table 4, together with those of Example 19.

TABLE 4

| | Condensed product | | Binder composition | | | | Furfurylated urea resin in binder composition (% by weight) | Compressive strengths | |
|---|---|---|---|---|---|---|---|---|---|
| | Species | (% by weight) | Furfuryl alcohol (% by weight) | 5-Hydroxy-methylfurfural (% by weight) | 2,5-Bis-(hydroxymethyl)furan (% by weight) | Silane coupling agent (% by weight) | | After 1 hour (MPa) | After 24 hours (MPa) |
| Example 19 | condensed product 5 | 37.90 | 31.95 | 20.00 | 10.00 | 0.15 | 14.78 | 1.21 | 6.97 |
| Example 26 | Condensed product 5 | 12.63 | 57.22 | 20.00 | 10.00 | 0.15 | 4.93 | 0.89 | 6.11 |
| Comparative Example 14 | Condensed product 5 | 0.00 | 69.85 | 20.00 | 10.00 | 0.15 | 0.00 | 0.49 | 2.88 |
| Comparative Example 15 | Condensed product 2 | 20.27 | 49.58 | 20.00 | 10.00 | 0.15 | 0.00 | 0.52 | 5.34 |

* One part by weight of a binder composition and 0.4 parts by weight of a hardening agent (US-3/C-21 = 15%/85%) were used based an 100 parts by weight of Fremantle new sand.
* Condensed product 5: the product contained 39% by weight of a furfurylated urea resin, 52% by weight of a urea resin other than the furfunilated urea resin, and 9% by weight of water.
* Condensed product 2: urea resin [UL-027, manufactured by J-CHEMICAL Inc.: urea resin wherein the ratio by mole of formaldehyde to urea is 2/1, the solid content is 67% (the balance: water), and no furfurylated urea resin is contained.]
* Silane coupling agent N-β-(aminaethyl)-γ-aminopropylmethyldimethoxysilane According to Table 4, in a case where a binder composition contains no furfurylated urea resin even when the composition contains 2,5-bis(hydroxymethyl)furan, the composition is small in respective compressive strengths after 1 hour and after 24 hours not to improve the hardening rate nor the mold strength.

Example 27, and Comparative Examples 16 to 17

Hardening Rate and Final Strength

Each kneaded sand was yielded and then measured about the compressive strengths thereof in the same way as in Examples 10 to 16, and Comparative Examples 6 to 12 except that one out of binder compositions shown in Table 5 was used and the ratio between the hardening agents US-3 and C-21 was changed as follows: US-3/C-21=15%/85%. The results are shown in Table 5, together with those of Example 23.

According to Table 5, in a case where a binder composition contains no furfurylated urea resin even when the composition contains 2,5-bis(hydroxymethyl)furan, the composition is small in respective compressive strengths after 1 hour and after 24 hours not to improve the hardening rate nor the mold strength.

According to Tables 3, 4 and 5, in Examples 17 to 27 and Comparative Examples 13 to 17, the same hardening agent composition (US-3/C-21=15%/85%) was used; however, this composition was a weaker hardening agent than the hardening agent composition (US-3/C-21=40%/60%) used in Examples 10 to 16 and Comparative Examples 6 to 12 in Table 2. This hardening agent was used to evaluate these examples about the hardening rate and the final strength thereof. The agent US-3 was a strong hardening agent while the agent C-21 was a weak hardening agent. Using the hardening agent, which was smaller in the blend proportion of the agent US-3, the evaluation was made for the following reason: when the contents of 5-hydroxymethylfurfural and 2,5-

TABLE 5

| | Condensed product | | Binder composition | | | | Furfurylated urea resin in binder composition (% by weight) | Compressive strengths | |
|---|---|---|---|---|---|---|---|---|---|
| | Species | (% by weight) | Furfuryl alcohol (% by weight) | 5-Hydroxy-methylfurfural (% by weight) | 2,5-Bis-(hydroxymethyl)furan (% by weight) | Silane coupling agent (% by weight) | | After 1 hour (MPa) | After 24 hours (MPa) |
| Example 27 | Condensed product 5 | 50.53 | 19.32 | 10.00 | 20.00 | 0.15 | 19.71 | 1.32 | 6.91 |
| Example 23 | Condensed product 5 | 37.90 | 31.95 | 10.00 | 20.00 | 0.15 | 14.78 | 1.74 | 7.14 |
| Comparative Example 16 | Condensed product 5 | 0.00 | 69.85 | 10.00 | 20.00 | 0.15 | 0.00 | 1.29 | 5.59 |
| Comparative Example 17 | Condensed product 2 | 20.27 | 49.58 | 10.00 | 20.00 | 0.15 | 0.00 | 1.12 | 3.68 |

* One part by weight of a binder composition and 0.4 parts by weight of a hardening agent (US-3/C-21 = 15%/85%) were used based an 100 parts by Fremantle new sand.
* Condensed product 5: the product contained 39% by weight of a furfurylated urea resin, 52% by weight of a urea resin other than the furfurylated urea resin, and 9% by weight of water.
* Condensed product 2: urea resin [UL-027, manufactured by J-CHEMICAL Inc.: urea resin wherein the ratio by mole of formaldehyde to urea is 2/1, the solid content is 67% (the balance: water), and no furfurylated urea resin is contained.]
* Silane coupling agent: N-β-(aminoethyl)-γ-aminopropylmethyldimethoxysilane bis(hydroxymethyl)furan is large as in Example 20, the reaction of the resin advances more rapidly; thus, according to the hardening agent composition used in each of Examples 10 to 16 and Comparative Examples 6 to 12, the kneaded sand reaches the bench life thereof when the kneaded sand is filled in the test piece pattern, so that the compressive strength cannot be precisely measured or evaluated by the method described in JIS Z 2604-1976.

The invention claimed is:

1. A binder composition for mold formation, comprising: one or more 5-position substituted furfural compounds selected from the group consisting of 5-hydroxymethylfurfural and 5-acetoxymethylfurfural; and a furfurylated urea resin;
wherein:
the one or more 5-position substituted furfural compounds are dissolved in the furfurylated urea resin and the content of the furfurylated urea resin is from 1 to 20% by weight,
the furfurylated urea resin is a condensed product made from furfuryl alcohol, urea and formaldehyde, in the furfurylated urea resin respective ratios by mole of formaldehyde and urea to each mole of furfuryl alcohol are from 0.5 to 8 moles of formaldehyde and 0.2 to 4 moles of urea to each mole of furfuryl alcohol, and
wherein the content of the furfuryl alcohol is from 60% by weight or more and 95% by weight or less.

2. The binder composition for mold formation according to claim 1, wherein the content of the 5-position substituted furfural compound(s) is from 1 to 30% by weight.

3. The binder composition for mold formation according to claim 1, wherein the ratio by weight of the 5-position substituted furfural compound(s) to the furfurylated urea resin [5-position substituted furfural compound(s)/furfurylated urea resin (ratio by weight)] is from 0.5 or more and 5.0 or less.

4. The binder composition for mold formation according to claim 1, wherein the ratio by weight of 5-hydroxymethylfurfural to the furfurylated urea resin [5-hydroxymethylfurfural/furfurylated urea resin (ratio by weight)] is from 0.5 or more and 5.0 or less.

5. The binder composition for mold formation according to claim 1, wherein the ratio by weight of 5-hydroxymethylfurfural to the furfurylated urea resin [5-hydroxymethylfurfural/furfurylated urea resin (ratio by weight)] is from 0.7 or more and 4.5 or less.

6. The binder composition for mold formation according to claim 1, wherein the furfurylated urea resin is a resin synthesized in the presence of urea and formaldehyde in furfuryl alcohol.

7. The binder composition for mold formation according to claim 1, wherein the furfuryl resin is obtained by reacting 0.6 to 30 parts by weight of urea and 0.4 to 40 parts by weight of formaldehyde with 100 parts by weight of furfuryl alcohol.

8. The binder composition for mold formation according to claim 1, wherein the content of an acid-hardening resin other than the furfurylated urea resin is from 4% by weight or more and 30% by weight or less.

9. The binder composition for mold formation according to claim 1, further comprising a hardening promoter.

10. The binder composition for mold formation according to claim 9, wherein the content of the hardening promoter is from 0.5% by weight or more and 63% by weight or less.

11. The binder composition for mold formation according to claim 9, wherein the hardening promoter is one or more selected from the group consisting of 2,5-bis(hydroxymethyl)furan and resorcin.

12. The binder composition for mold formation according to claim 11, wherein the hardening promoter is 2,5-bis(hydroxymethyl)furan, and the content of 2,5-bis(hydroxymethyl)furan is from 0.5% by weight or more and 63% by weight or less.

13. The binder composition for mold formation according to claim 11, wherein the ratio by weight of the 5-position substituted furfural compound(s) to 2,5-bis(hydroxymethyl)furan [5-position substituted furfural compound(s)/2,5-bis(hydroxymethyl)furan (ratio by weight)] is from 0.1 or more and 5 or less.

14. The binder composition for mold formation according to claim 11, wherein the ratio by weight of 2,5-bis(hydroxymethyl)furan to the furfurylated urea resin [2,5-bis(hydroxymethyl)furan/furfurylated urea resin (ratio by weight)] is from 0.2 or more and 2.5 or less.

15. The binder composition for mold formation according to claim 11, wherein the hardening promoter is resorcin, and the content of resorcin is from 1% by weight or more and 10% by weight or less.

16. The binder composition for mold formation according to claim 1, wherein the water content is from 0.5% by weight or more and 30% by weight or less.

17. The binder composition for mold formation according to claim 1, wherein the 5-position substituted furfural compound is 5-hydroxymethylfurfural.

18. The binder composition for mold formation according to claim 1, wherein the content of the furfurylated urea resin in the binder composition is from 2 to 20% by weight.

19. The binder composition for mold formation according to claim 1, wherein the content of the furfurylated urea resin in the binder composition is from 4 to 20% by weight.

20. A composition for a mold, wherein refractory particles, the binder composition for mold formation recited in claim 1, and a hardening agent for hardening the binder composition for mold formation are mixed with each other.

21. A method for producing a mold, comprising a step of hardening the composition for a mold recited in claim 20.

22. A method for producing a mold, comprising:
mixing refractory particles, the binder composition for mold formation recited in claim 1, and a hardening agent to produce a composition for a mold; and
hardening the composition for a mold to produce a mold.

* * * * *